OR    3,592,523

T3030D

United States Patent

[11] 3,592,523

[72] Inventor P
       K
[21] Appl. No. 825,702
[22] Filed May 19, 1969
[45] Patented July 13, 1971
[73] Assignee The National Cash Register Company
       Dayton, Ohio

[54] ANGLE MULTIPLIER APPARATUS
    2 Claims, 6 Drawing Figs.
[52] U.S. Cl. .................................................. 350/6,
       178/7.6, 350/7, 350/96 B, 350/285
[51] Int. Cl. ....................................................... G02b 17/00
[50] Field of Search .......................................... 350/6, 7,
       285, 96; 352/94, 105, 109; 178/7.6

[56] References Cited
    UNITED STATES PATENTS
| | | | |
|---|---|---|---|
| 2,429,111 | 10/1947 | Underhill | 350/285 X |
| 2,670,660 | 3/1954 | Miller | 350/285 |
| 2,687,062 | 8/1954 | Baird | 352/84 |
| 3,040,625 | 6/1962 | Zito | 350/150 X |
| 3,212,100 | 10/1965 | Buck | 352/109 |
| | | imba | 356/71 |
| | | Iams | 350/7 X |
| 3,448,438 | 6/1969 | Carlson et al. | 350/6 UX |

*Primary Examiner*—David Schonberg
*Assistant Examiner*—John W. Leonard
*Attorneys*—Louis A. Kline, John J. Callahan and John P. Tarlano ABSTRACT: The present invention relates to an angle multiplier apparatus, which increases the angle at which an incident beam, in an incident plane, is deflected by a beam-deflecting means with respect to said incident plane. An incident beam is deflected by the deflecting means at a first selected angle with respect to the incident plane. The deflected beam is redirected back onto the deflecting means from a side of the incident plane opposite from the deflected beam, and redeflected. The redeflected beam is deflected at a greater deflection angle with respect to the incident plane than the deflected beam, due to a shift of the deflected beam across the incident plane prior to its redeflection. By use of the angle multiplier apparatus of the present invention in a beam-scanning apparatus, the overall angle through which a beam may be scanned is increased.

FIG. I

INVENTOR
PAUL SHANG YU WU
BY
HIS ATTORNEYS

INVENTOR
PAUL SHANG YU WU

INVENTOR
PAUL SHANG YU WU

ANGLE MULTIPLIER APPARATUS

BACKGROUND OF THE INVENTION

In U.S. Pat. No. 3,212,100, issued Oct. 12, 1965, on the application of Willard E. Buck, a beam-scanning apparatus is shown wherein the rate of scan of a beam is increased by reflecting an incident beam, which incident beam is in an incident plane, off a rotating mirror and away from the incident plane, shifting the reflected beam by means of a tetrahedral prism farther from the incident plane, and re-reflecting the reflected beam off the rotating mirror. The reflected beam is shifted, by means of the tetrahedral prism, farther away from the incident plane prior to its re-reflection. The reflected beam is not shifted across the incident plane prior to re-reflection.

In the angle multiplier of the present invention, the angle of reflection produced on an incident beam which is in an incident plane, by a mirror, is increased. An incident beam, after being reflected by a mirror, is shifted, by means of a dove prism or fiber optical bundle, across the incident plane. After this shift across the incident plane, the reflected beam is re-reflected, at a greater angle, relative to the incident plane, than had been the reflected beam.

The overall angle of scan of a beam-scanning apparatus, such as a rotating mirror, may be increased by using the angle multiplier apparatus of the present invention. A beam deflector means of a beam-scanning apparatus will produce an overall scan angle. This scan angle may be multiplied by a factor greater than one, with the angle multiplier apparatus of the present invention, even though the beam deflector means is scanned through the same angle. The scanning velocity of a beam deflector means is limited by the size of the beam deflection means. The angle multiplier of the present invention allows for an increase in the scan velocity of a beam deflection means.

The angle multiplier apparatus of the present invention incorporates, as a beam shifter, a fiber optical bundle having crisscrossed fibers therein, or a dove prism, rather than a tetrahedral prism, as was used by Buck. A source beam which passes through the tip of a tetrahedral prism is not reflected or shifted, but is dispersed. A dove prism, or fiber optical bundle having crisscrossed fibers therein, however, has no tip. Due to loss of information by a tetrahedral prism, at its tip, it is not appropriate for use in an angle multiplier apparatus, to shift a reflected beam, which contains information therein, to the opposite side of an incident plane.

SUMMARY OF THE INVENTION

The present invention is an angle multiplier apparatus, comprising a beam-deflecting means for deflecting an incident beam away from an axis of deflection and away from an incident plane which contains said incident beam and said axis of deflection, and redirecting means for redirecting a deflected beam, which is produced by deflecting said incident beam from said deflecting means, across the incident plane which contains said incident beam and the axis of deflection of the beam-deflecting means, so that a redeflected beam is deflected at a greater angle with respect to the incident plane, by said beam-deflecting means, than was the deflected beam. The beam-deflecting means may be a reflector means, a refractor means, or a diffractor means.

An object of the present invention is to increase the angle through which a deflected beam of energy is scanned by an oscillating mirror.

Another object of the present invention is to increase the length of a line through which a deflected beam of energy is scanned by an oscillating mirror.

A further object of the present invention is to decrease the angle through which an oscillating mirror must be oscillated to produce a desired length of a line traced out by a deflected beam from an oscillating mirror.

Another object of the present invention is to allow the recording of more information per unit time on a photographic plate for a given velocity of oscillation and angle of oscillation of an oscillating mirror.

DESCRIPTION OF THE PREFERRED EMBODIMENT

Figure 1:
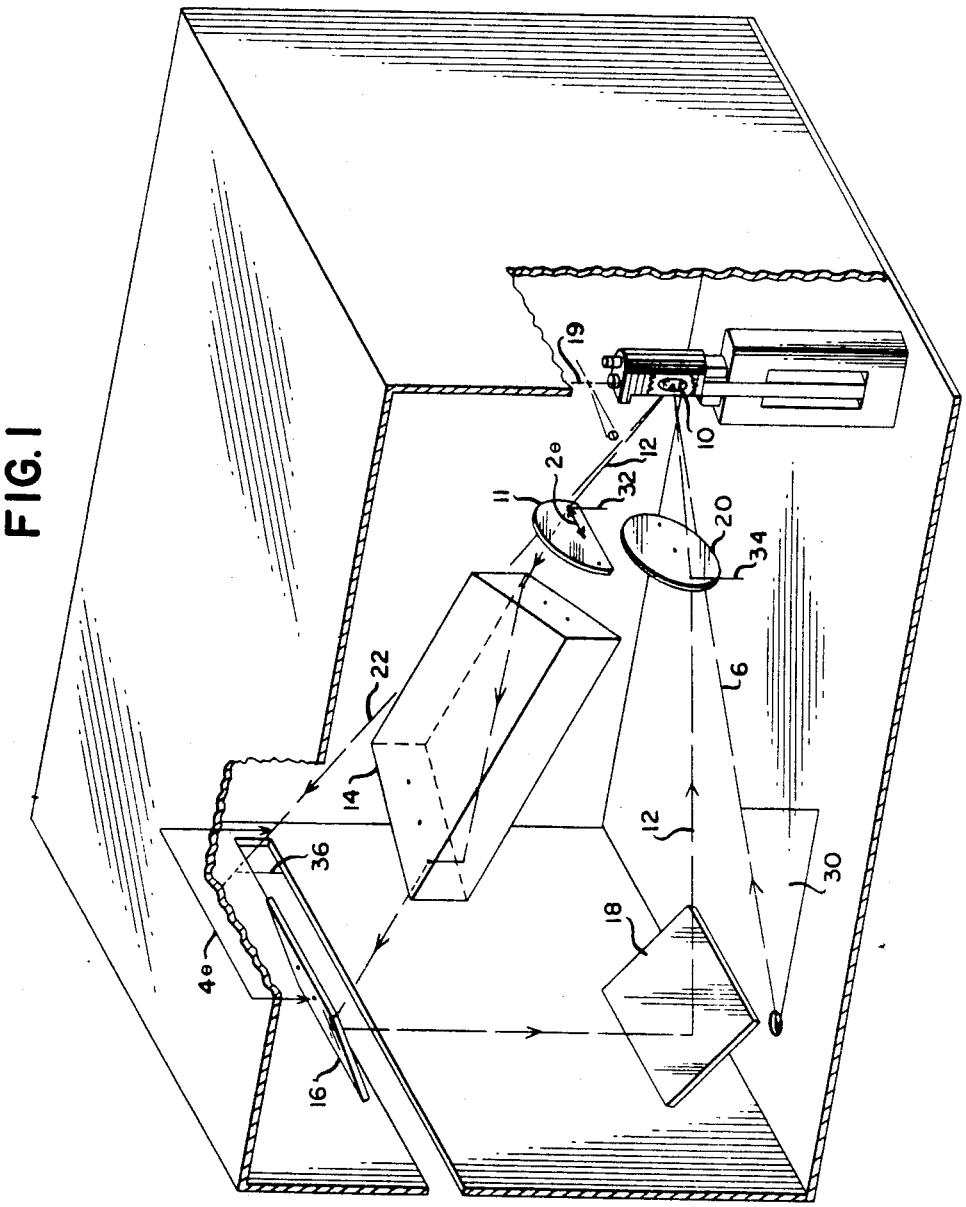
FIG. 1 is a perspective view of a dove-prism-type angle multiplier apparatus in conjunction with an oscillating mirror deflector.

FIG. 1 shows a dove-prism-type angle multiplier device used in conjunction with an oscillating mirror deflector which oscillates around its axis of reflection 19. The beam 6 and the axis of reflection 19 define an incident plane 30. The incident beam 6, such as a laser beam, is directed within the incident plane 30, which also contains the axis of reflection 19, upon an oscillating mirror 10. A line perpendicular to the mirror 10 makes an angle of $\theta°$ with respect to the incident plane 30. A beam 12 is reflected into a first distant plane 32, which plane 32 is at an angle of $2\theta°$ with respect to the incident plane 30. The center ray of the beam 12 is made parallel to the longitudinal axis of a dove prism 14, by a lens 11. The reflected beam 12 is passed through the dove prism 14. The reflected beam 12 is shifted across the incident plane 30, which incident plane 30 contains the source beam 6 and the axis of reflection 19 of the mirror 10. The reflected beam 12 is directed by a mirror 16 and a mirror 18 back toward the mirror 10. The reflected beam 12 passes through a focusing lens 20, which focusing lens 20 converges the beam 12 into a minute spot in a near plane 34. The near plane 34 is at an angle of $2\theta°$ with respect to the incident plane 30. A re-reflected beam 22 emerges from the mirror 10 within a second distant plane 36, which plane 36 is at an angle of $4\theta°$ with respect to the incident plane 30. The incident beam 6 is therefore deflected at an angle of $4\theta°$, with respect to the incident plane 30, for a mirror rotation of $\theta°$. The incident beam 6 could only be deflected at an angle of $2\theta°$, if the angle multiplier apparatus of the present invention were not used, for a mirror rotation of $\theta°$. The angle multiplier apparatus doubles the angle through which the incident beam 6 can be deflected.

As the mirror 10 scans through an angle of $1\theta°$, the incident beam 6 is scanned through an angle of $4\theta°$. The incident beam 6 could have been scanned only through an angle of $2\theta°$, if the angle multiplier apparatus of the present invention had not been used.

When the face of the mirror 10 is perpendicular to the incident plane 30, the incident beam 6 is not deflected out of the plane 30. It is only after the mirror 10 rotates, so that it is not perpendicular to the incident plane 30, that angle multiplication occurs.

FIG. 1 shows the shift in the reflected beam 12 across the incident plane 30. The dove prism 14 shifts the reflected beam 12 to the opposite side of the incident plane 30. This shift of the reflected beam 12 across the incident plane 30 is necessary for angle multiplication. The reflected beam 12 is directed by a mirror 16 and by a mirror 18 back toward the mirror 10. The reflected beam 12 passes through the focusing lens 20, which focuses it into the near plane 34 and upon the mirror 10. The near plane 34 is at an angle of 2θ° with respect to the incident plane 30. The re-reflected beam 22 is then directed into the second distant plane 36, which is at an angle of 4θ° with respect to the incident plane 30. The re-reflected beam 22, in the second distant plane 36, makes twice as great a reflection angle as did the reflected beam 12, with respect to the incident plane 30. The angular deflection of the re-reflected beam 22 is twice as great as the angular deflection of the reflected beam 12, with respect to the incident plane 30.

Figure 2:
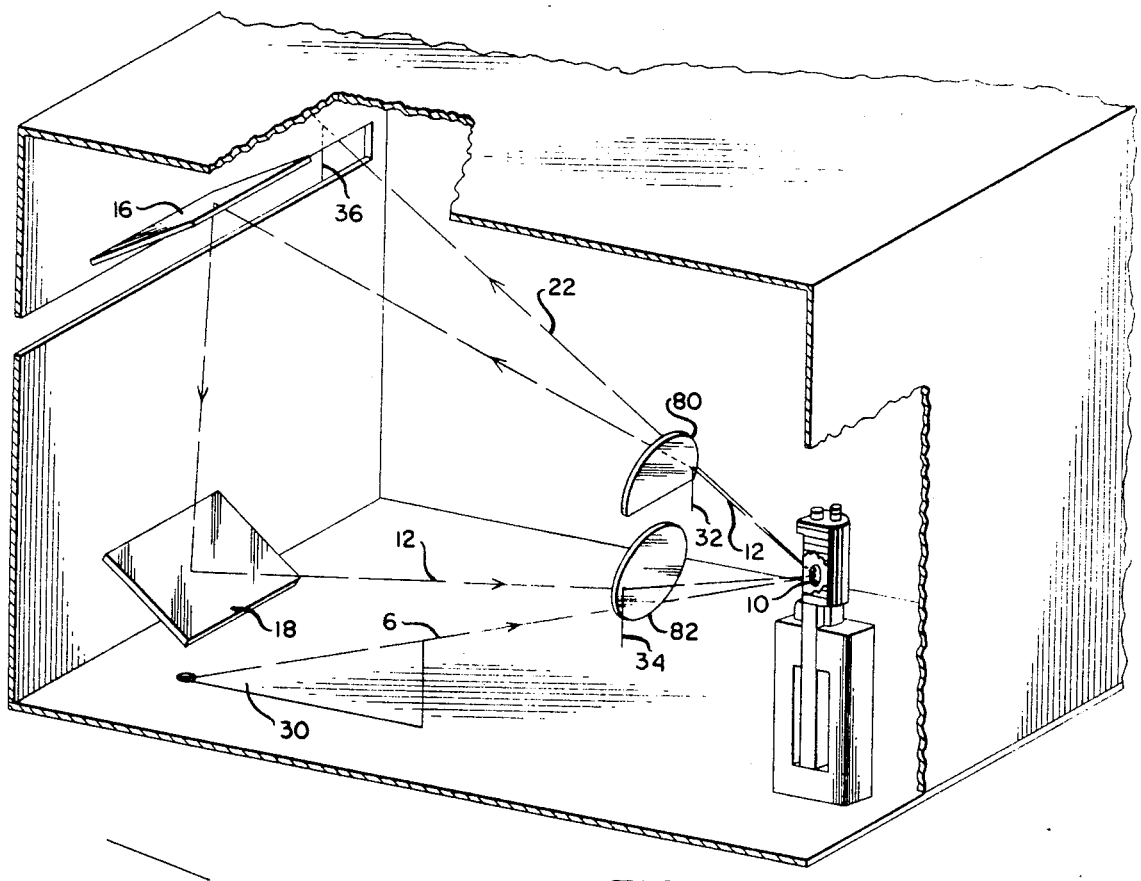
FIG. 2 is a perspective view of a lens-type angle multiplier apparatus in conjunction with an oscillating mirror deflector.
Figure 3:
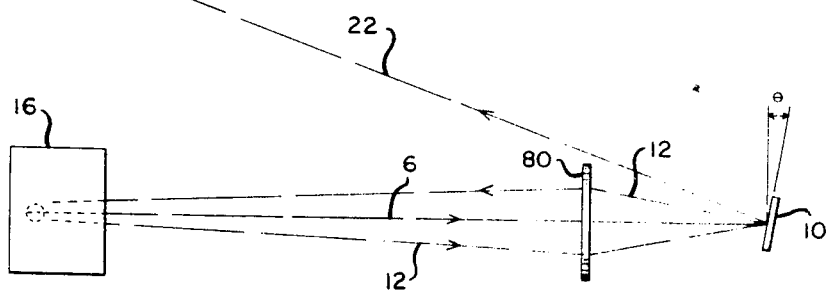
FIG. 3 is a plan view of the beam-scanning apparatus of FIG. 2.

FIGS. 2 and 3 show a lens-type angle multiplier apparatus used in conjunction with the oscillating mirror 10. A shifting of a reflected beam 12 across the incident plane 30 may be accomplished by means of the lens 80. The lens 80 has a focal length shorter than the distance between it and the oscillating mirror 10. The center of the lens 80 is placed within the incident plane 30. The lens 80 bends the reflected beam 12 toward the opposite side of the incident plane 30. The mirror 16 directs the beam 12 downwardly as the beam 12 is shifted across the incident plane 30. The reflected beam 12 is directed toward the lens 82 by means of the mirror 10. The reflected beam 12, having been shifted across the incident plane 30, is focused as a minute spot on the oscillating mirror 10, from the near plane 34, by means of the lens 82. The lens 82 has the same focal length as the lens 80. The re-reflected beam 22 emanates from the oscillating mirror 10 within the second distant plane 36. The second distant plane 36 makes an angle of 4θ° with respect to the incident plane 30.

Figure 4:
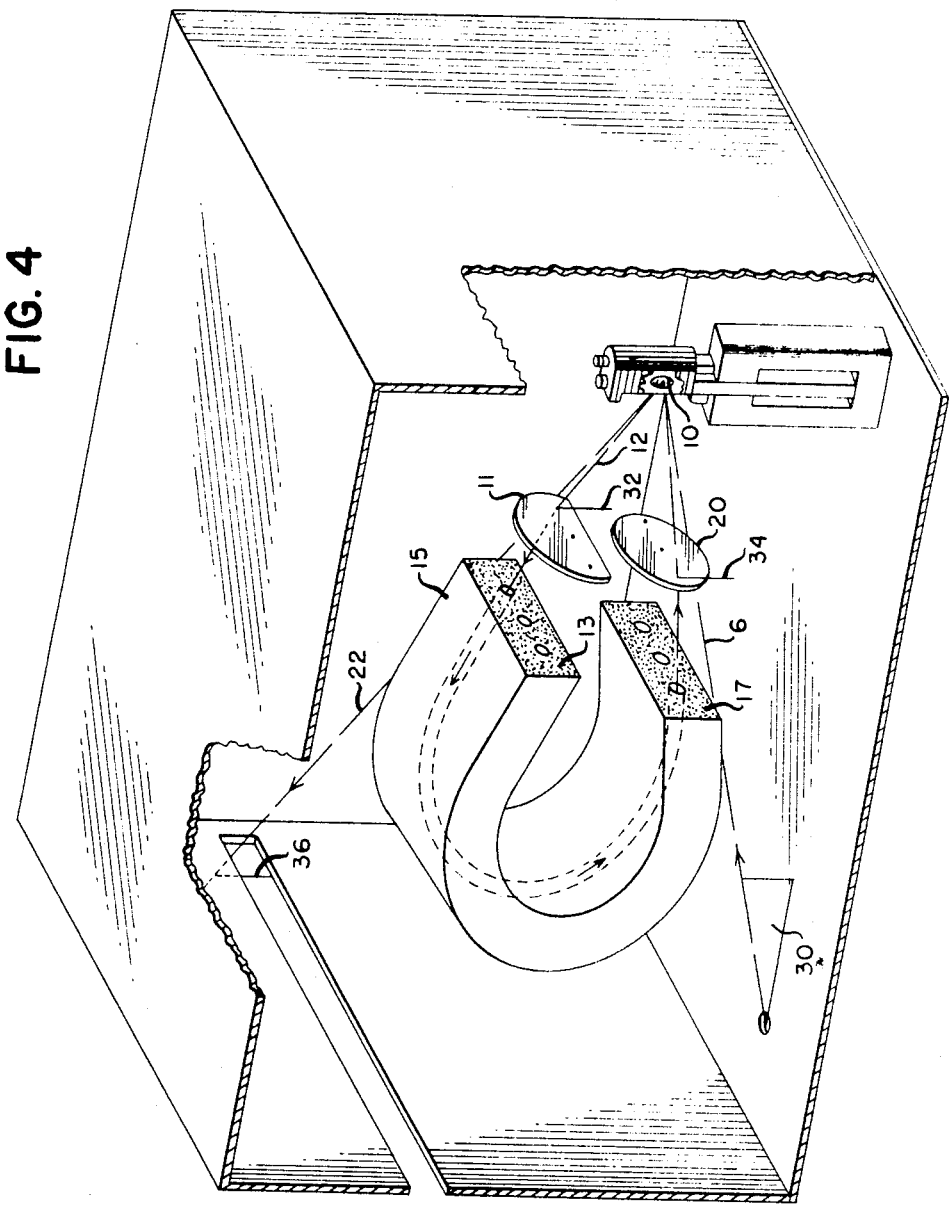
FIG. 4 is a perspective view of a fiber-optical-bundle-type angle multiplier apparatus in conjunction with an oscillating mirror deflector.

FIG. 4 shows a fiber optical bundle type of the angle multiplier apparatus. A shifting of the reflected beam 12 across the incident plane 30 may be accomplished by means of a fiber optical bundle 15, such as a glass fiber optical bundle, which has crisscrossed fibers therein. The center of the fiber optical bundle 15 is placed in the incident plane 30. The fibers on either side of the incident plane 30 are braided over to the other side of the incident plane 30. The braided fibers will produce a shift of a first reflected beam 12, incident upon them, across the incident plane 30.

The reflected beam 12 is incidented upon the face 13 of the fiber optical bundle 15. The reflected beam 12 is incidented upon the focusing lens 20 from the face 17 of the fiber optical bundle 15. The reflected beam 12, which was shifted across the incident plane 30, is again incidented onto the mirror 10 in the plane 34. The re-reflected beam 22 emanates from the mirror 10 within the second distant plane 36 and is at an angle of 4θ° with respect to the incident plane 30. The re-reflected beam 22 is deflected at an angle of 4θ°, while the reflected beam 12 is reflected at an angle of 2θ°, with respect to the incident plane 30.

Figure 5:
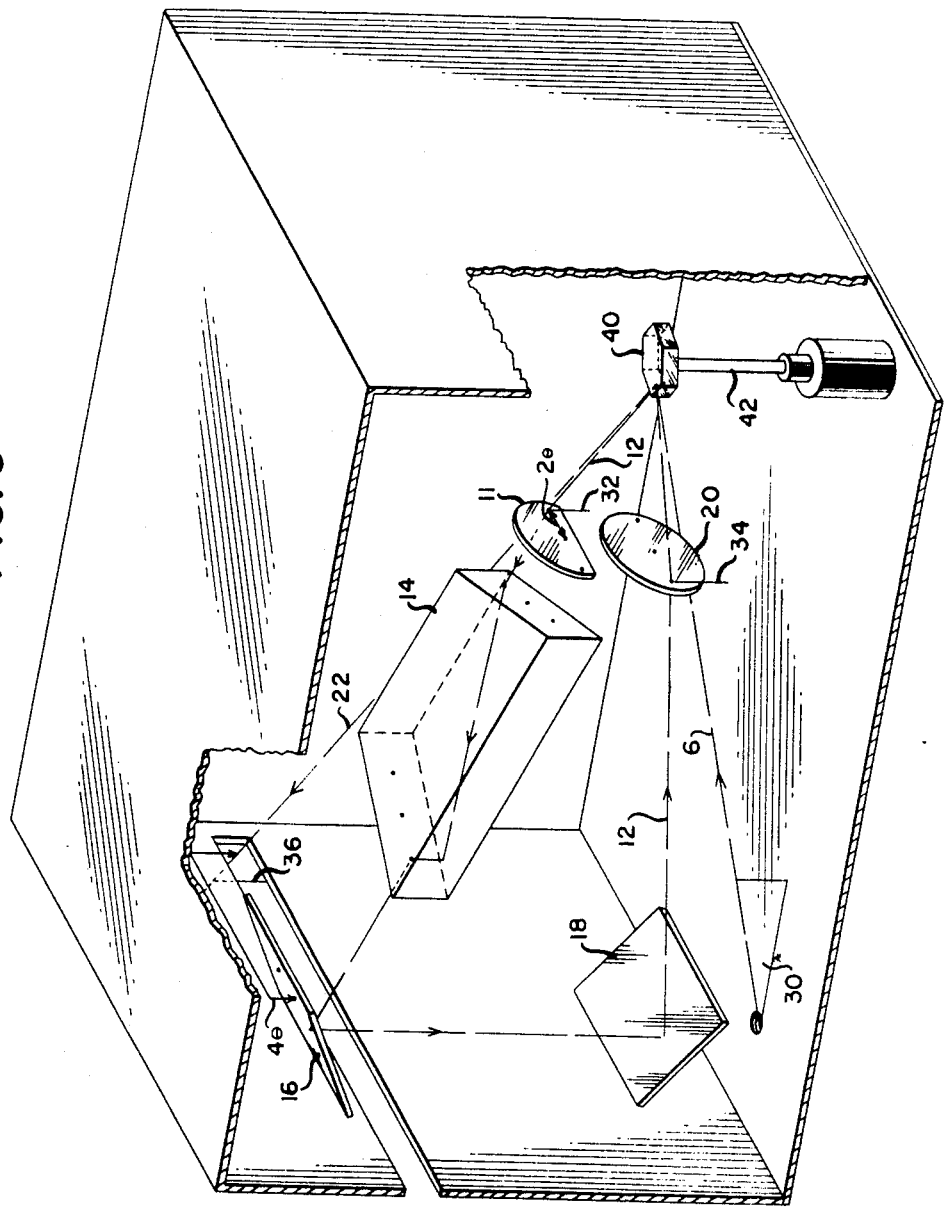
FIG. 5 is a perspective view of a dove-prism-type angle multiplier apparatus in conjunction with a rotating multifaced mirror deflector.

As shown in FIG. 5, a rotating multifaced mirror 40, having an axis of reflection 42, may be used in conjunction with a dove-prism-type angle multiplier apparatus. As the multifaced mirror 40 rotates, the incident beam 6 is reflected away from the incident plane 30. The incident plane 30 is defined by the incident beam 6 and the axis of reflection 42.

A reflected beam 12, which is outside of the incident plane 30, will be subject to angle multiplication. When the reflected beam 12 makes an angle of 2θ° with respect to the incident plane 30, the re-reflected beam 22 makes an angle of 4θ° with respect to the incident plane 30.

Figure 6:
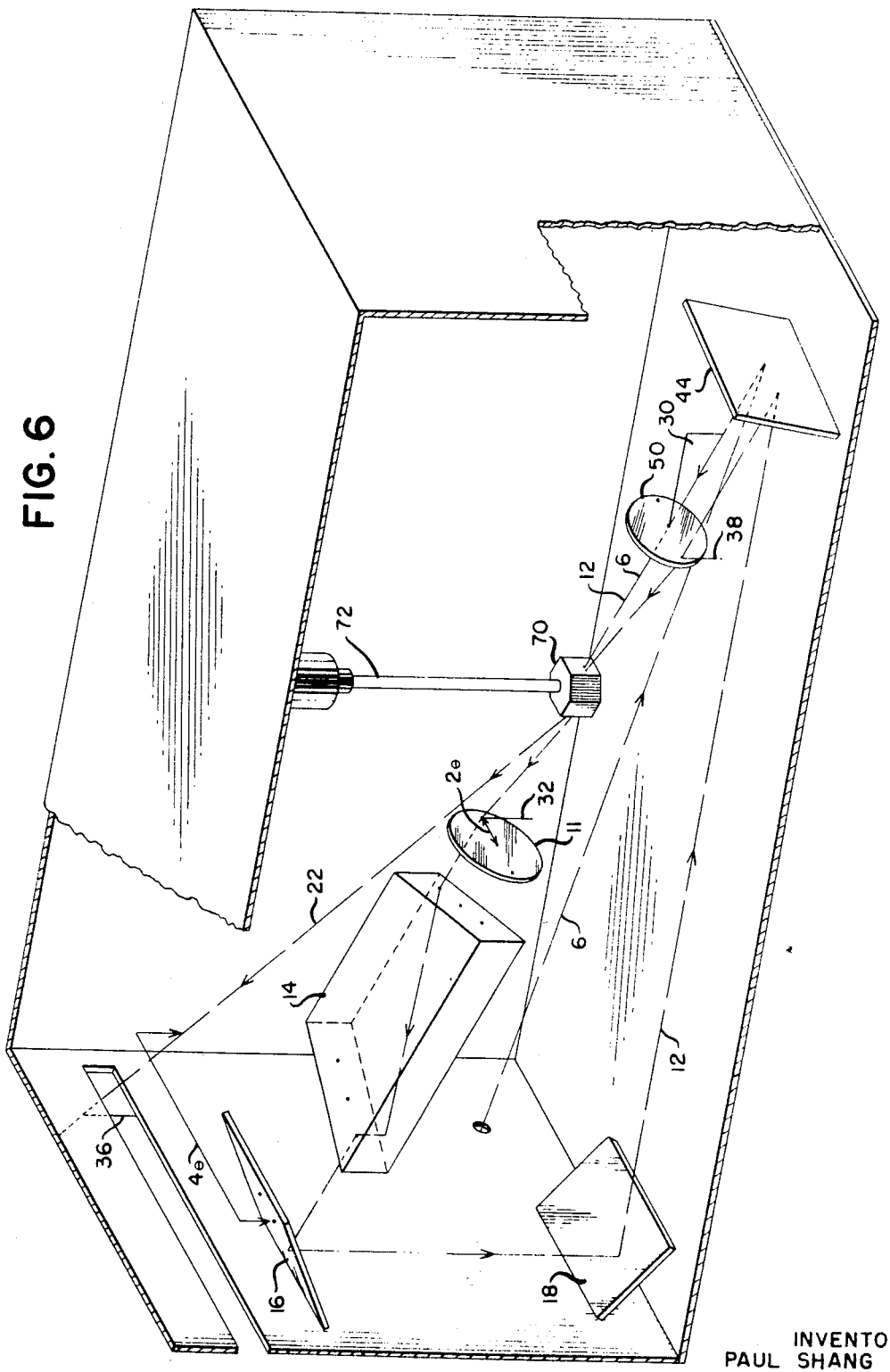
FIG. 6 is a perspective view of a dove-prism-type angle multiplier apparatus in conjunction with a multifaced prism deflector.

As shown in FIG. 6, a multifaced prism refractor 70 may be used in conjunction with a dove-prism-type angle multiplier apparatus. The multifaced prism refractor 70 has an axis of refraction 72. An incident beam 6 and the axis of refraction 72 define an incident plane 30. The multifaced prism refractor 70 refracts the incident beam 6 as a refracted beam 12, at an angle of 2θ° with respect to the incident plane 30. The refracted beam 12 is shifted across the incident plane 30 by the dove prism 14. The refracted beam 12 is reflected successively by the mirrors 16, 18, and 44 onto the lens 50. The beam 12 is incidented, in the plane 38, onto the refractor 70. A re-refracted beam 22 emanates from the refractor 70 at an angle of 4θ° with respect to the incident plane 30.

An acoustic standing wave cell diffractor may be used in place of a rotating multifaced prism. Acoustical vibrations are set up in liquid within said cell, so as to produce standing waves, or parallel regions of greater and less liquid density, within said closed liquid cell. Said parallel regions of greater and less liquid density are diffraction points, to diffract an incident beam at an angle with respect to an incident plane. The diffraction angle depends upon the wavelength of the standing waves set up within the acoustic standing wave cell.

An electro-optical crystal refractor may be used in place of a rotating multifaced prism. Such an electro-optical crystal will refract an incident beam through an angle of 2θ°, when a voltage is produced across the electro-optical crystal. The angle multiplier apparatus of the present invention may be used in conjunction with the electro-optical crystal, to multiply the angle of refraction produced by the electro-optical crystal. The angle multiplier apparatus may be a dove prism type, a lens type, or an optical fiber bundle type of angle multiplier apparatus.

Any type of apparatus which shifts the beam 12 across an incident plane which contains the incident beam and the deflection axis from which the incident beam is to be deflected may be used to produce an angle multiplier apparatus of the present invention. It is necessary only to redeflect the deflected beam, after it has been shifted across the incident plane, to multiply the amount of deflection of an incident beam with respect to the incident plane.

Further, the redeflected beam may be shifted again and again across the incident plane 30, and deflected. The angle multiplier apparatus may be so constructed as to produce a number of deflections, and shifts across an incident plane. An increased value of multiplication of the angle multiplier apparatus may be thus achieved.

What I claim is:

1. An angle multiplier apparatus, comprising: a rotatable deflecting means for deflecting an incident beam away from an axis of deflection, and away from an incident plane which contains said incident beam and said axis of deflection, a dove prism for continuously shifting a deflected beam, which is produced by deflecting said incident beam from said rotatable deflecting means, across said incident plane at a point removed from said rotatable deflecting means, said incident plane containing said incident beam and said axis of deflection of said rotatable deflecting means, a collimating lens located between said rotatable deflecting means and one end of said dove prism for making said deflected beam parallel to the length of said dove prism, upper and lower mirror reflector means positioned so that the intersection line of their mirror planes is perpendicular to said axis of deflection, said upper mirror reflector means being at the other end of said dove prism for directing said deflected beam coming from said dove prism, back into operative association with said rotatable deflecting means, a focusing lens located between said lower mirror reflector means and said rotatable deflecting means operable to place said deflected beam, at a point of said rotatable deflecting means, with a predetermined beam diameter, said deflected beam again striking said rotatable deflecting means from a side of said incident plane opposite to said deflected beam, so that a redeflected beam issues from said rotatable deflecting means at a greater angle relative to said incident plane than did the reflected beam, and also issues from said rotatable deflecting means when the incident beam is deflected in said incident plane.

2. A beam-scanning apparatus for continuously scanning a beam comprising, in combination, a source of an incident beam of electromagnetic wave energy radiation, rotatable deflecting means for deflecting said incident beam away from an axis of rotation of said rotatable deflecting means and out of an incident beam plane containing said incident beam and said axis of rotation of said rotatable deflecting means, a dove prism positioned so that a deflected beam, so produced, will pass therethrough, said dove prism being operable with continuously shift the position of said deflected beam coming from said rotatable deflecting means across said incident plane, a collimating lens located between said rotatable deflecting means and one end of said dove prism for making said deflected beam parallel to the length of said dove prism, upper and lower mirror reflector means positioned so that the intersection line of their mirror planes is perpendicular to said axis of rotation, said upper mirror reflector means being located at the other end of said dove prism for directing said deflected beam coming from said dove prism, back into operative association WITH said rotatable deflecting means, a focusing lens located between said lower mirror reflector means and said rotatable deflecting means operable to place said deflected beam at a point of said rotatable deflecting means with a predetermined beam diameter, said deflected beam again striking said rotatable deflecting means from a side of said incident plane opposite from said deflected beam, so that a redeflected beam issues again from said rotatable deflecting means at a greater angle relative to said incident plane than did said deflected beam, and issues from said rotatable deflecting means when said incident beam is deflected in said incident beam plane.